(12) United States Patent
Rohrbaugh (10) Patent No.: US 8,719,123 B2
(45) Date of Patent: May 6, 2014

(54) REPORTING CIRCUIT BREAKER AND SYSTEM

(76) Inventor: Thomas M. Rohrbaugh, Reston, VA (US)

( * ) Notice: Subject to any disclaimer, the term of this patent is extended or adjusted under 35 U.S.C. 154(b) by 18 days.

(21) Appl. No.: 13/311,478

(22) Filed: Dec. 5, 2011

(65) Prior Publication Data

US 2013/0144768 A1 Jun. 6, 2013

(51) Int. Cl.
*G07F 19/00* (2006.01)
(52) U.S. Cl.
USPC ............... 705/34; 361/622; 361/115; 361/42; 361/64; 361/624; 324/424; 324/110; 324/522; 324/127; 702/62; 702/57; 702/60; 370/351; 370/230; 370/252; 370/401; 370/254; 380/255; 380/282
(58) Field of Classification Search
USPC .......................................................... 705/34
See application file for complete search history.

(56) References Cited

U.S. PATENT DOCUMENTS

2002/0105770 A1* 8/2002 Seese et al. .................... 361/115
2006/0238932 A1* 10/2006 Westbrock et al. ............. 361/42

OTHER PUBLICATIONS

Ginsberg, Craig. Design and Development of an Experimental Test Stand for Electric and Hybrid Electric Vehicle Powertrains. The Cooper Union for the Advancement of Science and Art, UMI Dissertations Publishing, 2011.*

* cited by examiner

*Primary Examiner* — Ryan Zeender
*Assistant Examiner* — Fawaad Haider
(74) *Attorney, Agent, or Firm* — James A. Italia; Italia IP (57) ABSTRACT

A circuit breaker having internal power monitoring and data signal generating apparatus, and a system for utilizing such a circuit breaker in a facility having a plurality of tenants served by branch circuits from a plurality of distribution panels. The circuit breaker radiates signals indicative of power consumption of the branch circuit protected thereby, together with a unique address identifier tied to one tenant. Electrical billings are based on summing all signals for each tenant. Changes to branch circuits during tenancy will not disturb correct billings since individual circuit breakers are associated with that tenant using power supplied by each branch circuit. Hence changes to branch circuits may be limited to modify building space locations served by the modified branch circuit, and need not be further modified to maintain correct billing in light of the circuit changes.

11 Claims, 4 Drawing Sheets

REPORTING CIRCUIT BREAKER AND SYSTEM

CROSS-REFERENCE TO RELATED APPLICATION

This application claims priority to U.S. Non-Provisional Utility application Ser. No. 12/418,182 filed Apr. 3, 2009, the contents of which are incorporated by this reference.

FIELD OF THE INVENTION

The present invention relates to electrical power distribution systems for facilities such as commercial buildings housing plural tenants, and more particularly, to circuit protective systems which have the ability to communicate data pertaining to electrical system operation back to a central station in a manner enabling electrical consumption billings for the tenants to remain appropriate despite periodic reallocation of branch circuits to different tenants.

BACKGROUND OF THE INVENTION

Increasing demand for conservation of resources and accounting for the particular use of those resources, specifically electricity, encourages building owners of buildings containing plural entities such as tenants to retrofit buildings with associated meters and corresponding individual electricity distribution panels for each tenant or account, with the intent of back-charging individual tenants for power consumption. However, the power distribution procedures and apparatus imposed by others, such as to comply with the National Electric Code, require particular procedures and apparatus which may not be available or cost-effective for retrofitting a multi-tenant building.

In commercial facilities such as office buildings and retail centers, the building space is divided into smaller units for the individual tenants, for whom the power consumption should be billed according to the actual usage of the individual tenant. However, periodic turnover of tenants and the resulting continual renovation and reallocation of building space to different tenants typically requires that any tenant undergoing a change, such as increasing or decreasing space within the building, or adding or deleting branch circuits to serve changing loads, may requiring re-routing of branch circuits from the circuit protective apparatus, such as circuit breaker panels, to the point of use, such as power receptacles and hard wired equipment connections in the case of large equipment requiring dedicated branch circuits, or modifications to those branch circuits. A modification may for example disconnect the distal portion of a branch circuit, with the branch circuit subsequently being extended to space not previously provided with electrical power, or alternatively, being reconnected to the distal portion of a branch circuit which has in turn been disconnected from its original distribution panel. This type of modification to a building entails not only significant costs due to electrical construction and remodeling, but also disruption to both the tenants requiring electrical modifications and also to other tenants who may be affected by temporary power disconnections to accommodate the modification project.

The world of commercial and other facilities having plural tenants and other entities who are susceptible to such disruptions remains in need of a system which can adapt billing procedures for electrical consumption to reflect appropriate billings with minimal changes to the physical electrical distribution system.

SUMMARY OF THE INVENTION

The present invention addresses the above stated need by providing a system enabling facilities subdivided into a plurality of tenant spaces to determine electrical charges pertaining to any one tenant space to be determined by remote reporting of consumption data from each circuit breaker. This is done in a manner such that even where circuit breakers serving one tenant may be distributed between or among two or more distribution panels, consumption data is linked to an identifier associated with the appropriate tenant. Hence, appropriate calculated electrical charges will be summed for each tenant despite the origin of branch circuits serving the tenant.

This is particularly advantageous in situations wherein tenant usages change over time. As is typical in commercial rented premises, occupiable space leased to any one tenant may change in location, area, due to remodeling of the space, and in other ways. Accordingly, branch circuits serving the tenant space may change with remodeling and like changes to the tenant space or spaces.

The system utilizes circuit breakers each of which transmits signals indicative of electrical consumption for billing purposes, and also an identifying address which enables a device receiving and processing consumption signals to associate consumption signals from different circuit breakers with the correct or appropriate tenant. The processing device may then prepare billing charges to be posted to the electrical billing account for each tenant. Billing will then reflect electrical usage attributable to each tenant regardless of which branch circuits serve each individual tenant, and in which distribution panel branch circuits originate (alternatively stated, which distribution panel houses the circuit breaker for any branch circuit serving an individual tenant).

The circuit breakers contain internally a sensor for monitoring electrical consumption, and a transmitter for transmitting sensed data. The transmitter is capable of including in transmitted data identification of the circuit breaker or of the tenant associated with the monitored consumption, so that that circuit breaker, or a plurality of similar circuit breakers, can transmit data to a remote data collector and processor which can then generate an accurate billing which may be posted to the account of each tenant so monitored.

The circuit breaker may have conventional external configuration and dimensions. This enables the circuit breaker to be installed in conventional pre-existing distribution panels, in turn enabling the novel billing arrangement to be implemented even where a conventional electrical installation is present in a building. By having a circuit breaker with conventional external configuration and dimensions, but the added metering and signaling functionality disclosed herein, a user is able to simply: 1) remove the cover of a standard electrical panel; 2) remove the conventional non metering circuit breaker by popping it out of its location in the panel; and 3) snap in the new metering circuit breaker disclosed herein in the same space occupied by the old circuit breaker. The anticipated time of replacement is less than one minute and you have now gone from simply an over current protection device to an over current protection device and a current measuring device with no alteration to the electrical panel or electric circuit. There is virtually no cost to make this improvement except the cost of the novel circuit breaker disclosed herein and the labor to install it, which would be minimal given the "plug-and-play" nature of the installation.

An important consequence of the novel circuit breaker and system is that tenant electrical needs may be served from any branch circuit deemed suitable by an electrician, without having to devote particular distribution panels to specific tenants. In fact, distribution panels may have different circuit breakers dedicated to different tenants. Tenants may obtain electrical service to contiguous leased space from widely separated circuit breakers and distribution panels. Accurate billing may be accomplished seamlessly both initially, and also after a remodeling project changes which tenant or tenants are served by which circuit breakers and distribution panels. This in turn minimizes electrical construction work which would otherwise be necessary to assure correct billing over time as remodeling and like changes occur to tenant spaces.

It is an object of the invention to enable accurate billing of tenants for electrical charges despite changes over time to tenant spaces which significantly change branch circuits and distribution panels.

Another object of the invention is to provide a circuit breaker capable of implementing an accurate billing arrangement without requiring hard wired connection for data transfer, and which can be installed conventionally in a distribution panel.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
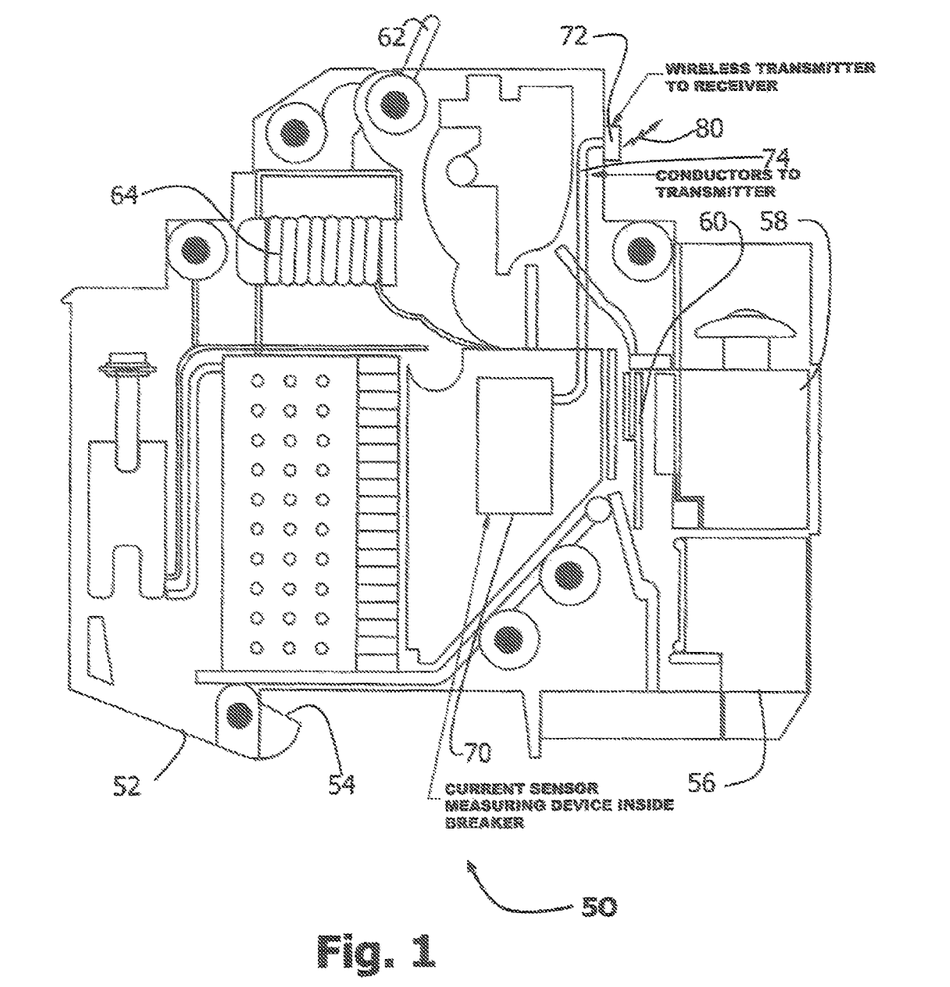
FIG. 1 is a side cross sectional view of a circuit breaker according to at least one aspect of the invention.

Referring first to FIG. 1, according to at least one aspect of the invention, there is shown a circuit breaker 50 of the type which engages a distribution panel such as the distribution panel 102 (see FIG. 2) by a protrusion 42. The distribution panel 102 may be of a conventional type, such as being of the QO® or Homeline® series, these being commercial products of the Square D.Company of Palatine, Ill. Similar products are offered by established manufacturers such as General Electric, Westinghouse, Allen Bradley, and Cutler Hammer, to name but a few. Circuit breakers which may be used with the distribution panels are individually available on the commercial market in the United States. These may be called plug-in circuit breakers since they are installed in the distribution panel into their final operative position by a snap fit of sorts, or resilient engagement, without using fasteners such as screws. The circuit breaker 50 may in many respects be similar to conventional circuit breakers which are intended for use with conventional distribution panels such as the distribution panel 102. Therefore, description of the circuit breaker 50 will emphasize the novel features and only minimally recite known features, it being recognized that overcurrent protective features and features necessary for use with conventional distribution panels are conventional.

Referring to the exemplary embodiment of the reporting circuit breaker 50 according to the present invention, a housing 52 provides a circuit breaker which typically engages a distribution panel by protrusion 42, and a power distribution connector 56 (and ultimately connected to service 106, FIG. 2), which in turn is connected to branch connector 58 with movable internal contacts, including a bimetallic member 60, responsive to a manual actuator lever or externally accessible handle 62 and to the solenoid 64, wherein the bimetallic member 60 and/or solenoid 64 are responsive to overload conditions and are connected to cause internal contacts to interrupt a circuit connection between power distribution connector 56 and branch circuit connector. The bimetallic member 60 and solenoid 64, together with any other components necessary for operation as described, will be referred to hereinafter as a circuit closure device. The circuit closure device is connected to electrical conductors within the circuit breaker 50 to provide a continuous yet interruptible electrical circuit between at least two externally accessible terminals, and to interrupt the continuous electrical circuit in response to a current flow between the terminals in excess of a selected threshold value. The externally accessible terminals are disposed to receive and electrically connect to external power conductors which establish a power circuit which extending throughout the premises to be served by the circuit breaker 50 and its associated distribution panel.

The operating handle 62 is capable of moving between a first position wherein two of the plurality of contacts controlled by the operating handle 62 complete an electrical circuit extending between two of the terminals and a second position wherein the two contacts open the electrical circuit extending between two of the terminals.

According to the present invention, the exemplary circuit breaker 50 further includes a current sensor 70 disposed to provide a signal on connections 74 to a wireless transmitter 80 according to the power load imposed on the branch circuit by externally connected equipment (not shown). The transmitter 80 provides a first radiated signal corresponding to the current sensor 70 signal, which is therefore indicative of sensed magnitude of flow of current, and a second radiated signal unique to the particular circuit breaker 50 and therefore to the branch circuit to which the circuit breaker is connected, or alternatively stated, is indicative of identification of the particular circuit breaker which is reporting electrical consumption data for billing calculations.

The second radiated signal is a unique identification signal capable of distinguishing the circuit breaker generating the second radiated signal from other structurally similar circuit breakers which generate other radiated signals containing identification data. The second radiated signal contains identification data correlating the circuit breaker generating the second radiated signal with a predetermined one of plural occupants of a facility containing the circuit breaker which generates the second radiated signal in a manner which distinguishes the predetermined one of the plural occupants from radiated signals of circuit breakers associated with other ones of the plural occupants.

It is an important feature of the invention that the housing of the circuit breaker 50 is disposed to entirely and internally contain the circuit closure device, the current monitoring device such as the current sensor 70 and the transmitter 80. The housing is dimensioned and externally configured in the manner of a conventional commercially available circuit breaker for use with plug-in distribution panels, so as to enable conventional installation within the distribution panel, such as the panel 102 of FIG. 2, and immediate operability in reporting electrical consumption for billing calculation without further assembly and wiring operations apart from connection of the branch circuit being monitored for billing purposes.

As an alternative to identifying itself, the circuit breaker 50 may be programmable to issue an identification signal corresponding to the particular tenant for which the connected branch circuit is associated (and therefore to be billed for power consumption). In other words, the indentification signal may identify the particular circuit breaker, with correlation to the appropriate tenant being made subsequently, or alternatively, may identify only the tenant, with one or more first signals subsequently being summed to arrive at an accurate, appropriate total electrical consumption value to establish the basis for billing of the identified tenant.

Regardless of whether correlation of billing data with the circuit breaker being reported is made immediately as a function of the first and second radiated signals, or whether this correlation must be made subsequently in a data processing component which receives and sums electrical consumption data, billings will remain properly apportioned to the tenant using power from monitored circuit breakers.

The current sensor 70 may comprise a commercially available current sensor, e.g. a current transformer, etc., capable of monitoring current in the range of current corresponding to the load rating of the circuit breaker 50.

The transmitter 80 may be wireless, such as a radio frequency transmitter. Alternatively, the transmitter 80 may if desired impress a data signal for transmission onto the electrical power conductors carrying power being monitored for billing purposes. Of course, a combination of signal propagation methods may be used.

The current sensor 70 and the transmitter 80 may incorporate any of the features described in United States Patent Application 2006/0238932, listing Westrock, Jr., et al. as inventors, and published on Oct. 26, 2006, which Patent Application is incorporated herein in its entirety by reference.

The circuit breaker 50 may comprise an illuminable indicator disposed on the externally accessible operating handle 62, and circuitry disposed to illuminate the illuminable indicator so as to annunciate an operating condition of the circuit breaker. This illuminable indicator may comprise a light emitting diode encapsulated within the operating handle 62. The circuitry serving the illuminable indicator may comprise conductors extending to the load side of two of the terminals to which branch circuit conductors are connected. The above described connection scheme would be appropriate for sensing current flowing through the terminals of the circuit breaker 50 and to illuminate the illuminable indicator responsive to sensing of current flowing through the terminals of the circuit breaker 50. In conformity with widespread convention, the illuminable indicator of current flow during ordinary power consumption may be green.

In a further option, an illuminable indicator may be provided to sense and annunciate tripping of the circuit breaker 50 and to illuminate the illuminable indicator responsive to sensing tripping of the circuit breaker 50. Auxiliary contacts (not shown) may be provided to close a circuit between the line side of the contacts of two of the terminals to which branch circuit conductors are connected, and to extend to the latter illuminable indicator, to indicate tripping. Again in conformity with widespread convention, the illuminable indicator of tripping may be red.

Figure 2:
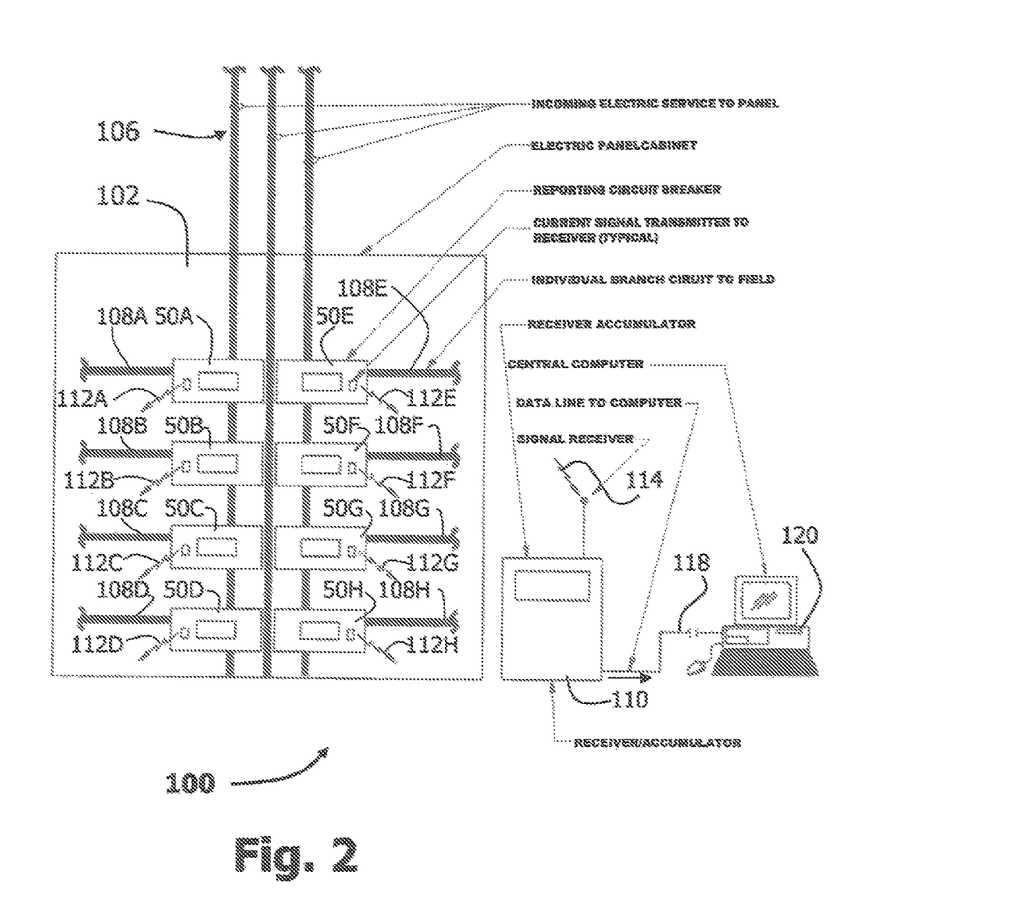
FIG. 2 is a diagrammatic view of a distribution panel and other components utilized to implement a billing management system according to an aspect of the invention.

Referring now to FIG. 2, in a representative system 100, the individual circuit breakers 50A-50H are disposed in a typical distribution panel 102 and are connected to a power source, such as from a power line pole, street connection, etc. via a service 106. The individual circuit breakers 50A-50H (each corresponding structurally and functionally to the circuit breaker 50 of FIG. 1) are connected to corresponding branch circuits 108A-108H having loads (not shown) which impose a power drain monitored by each circuit breaker 50A-50H and sending a corresponding wireless transmission 112A-112H to be received (represented as radio frequency signals 114) by receiver/accumulator 110, which is in turn sends the data signals to a computer 120 via connection 118.

In exemplary one facility embodiment, circuits 108A, 108C and 108E may be associated with tenant A, while circuits 108B, 108D and 108F may be associated with tenant B, and so forth. In the case that each circuit breaker has unique individual identifications, the receiver/accumulator 110 or the computer 120 will be programmed to combine the signals, and with them the value for the power drawn in the associated branch circuits, together for the corresponding tenant, and further combine signals from other circuit breakers for other corresponding tenants. In the case where circuit breakers for the same tenant are programmed to provide an identical identification signal for the corresponding tenant, the receiver/accumulator 110 and/or the computer 120 provides a tenant accounting of power drain for received signals having the same identification.

A circuit breaker such as the circuit breaker 50 has particularly advantageous application in commercial facilities which have plural tenants and building space subdivided into tenant spaces occupied by individual tenants for whom power consumption is to be billed to a dedicated billing account for each tenant according to usage of each one of the tenant spaces. In such commercial facilities, remodeling changes to the tenant spaces tend to occur over time as tenants move in and out, and some tenants change the amount of or location of leased space within a facility or both. In many cases, such remodeling changes require reallocation of branch circuits which may originate from any of a plurality of electrical distribution panels.

Figure 3:
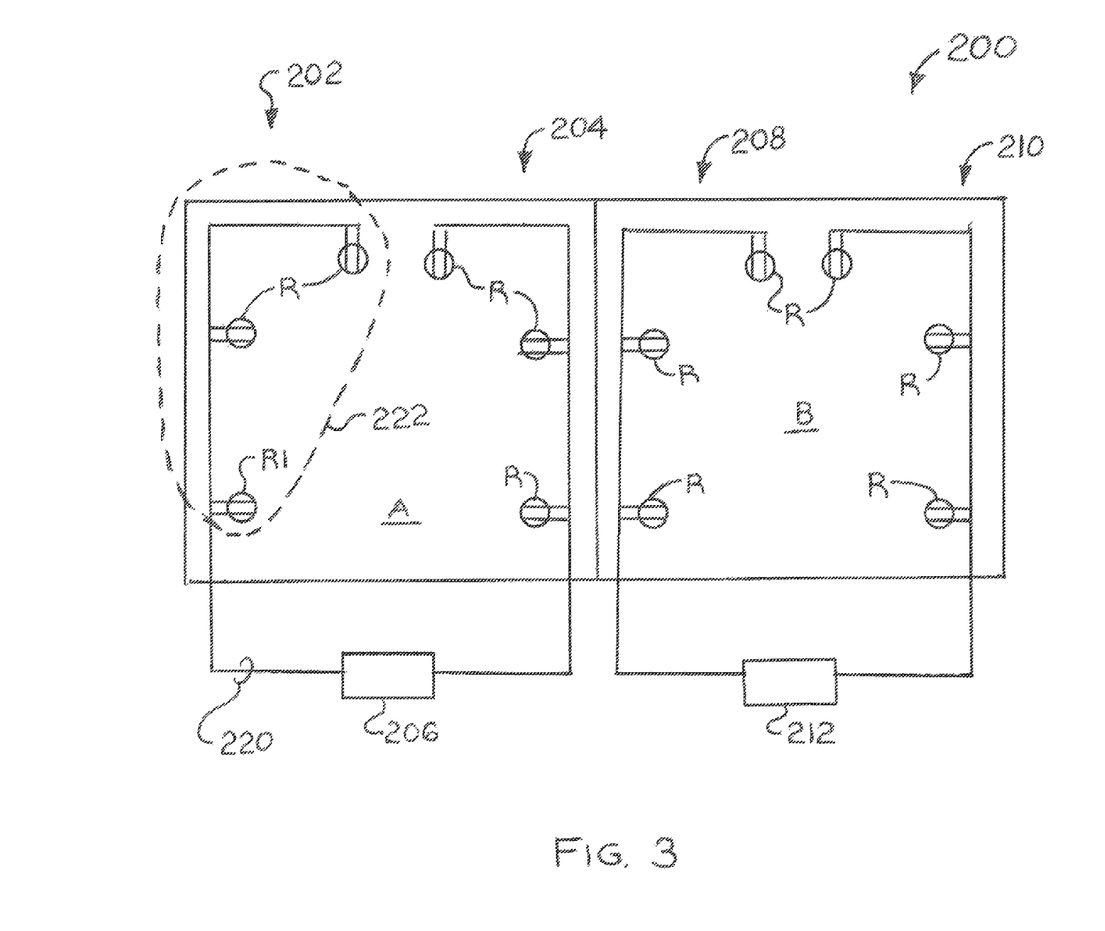
FIG. 3 is a diagrammatic floor plan illustrating a hypothetical commercial facility in an initial phase of tenant occupancy.

FIG. 3 illustrates an illustrative use of tenant space in a facility 200 which has been divided into a tenant space for a first tenant A and a tenant space for a second tenant B. The space of the tenant A derives power for branch circuits 202, 204 from a distribution panel 206. The space of the tenant B derives power for branch circuits 208, 210 from a distribution panel 212. For the purposes of this example, the branch circuits 202, 204, 208, 210 serve duplex receptacles R to satisfy minor general purpose electrical appliances, as might be typical of office space. As long as respective distribution panels 206, 212 each serve only one tenant, it would be possible to determine appropriate electrical charges to be applied to the billing accounts of the tenants by providing a master electric meter (not show) for each distribution panel 206, 212.

Figure 4:
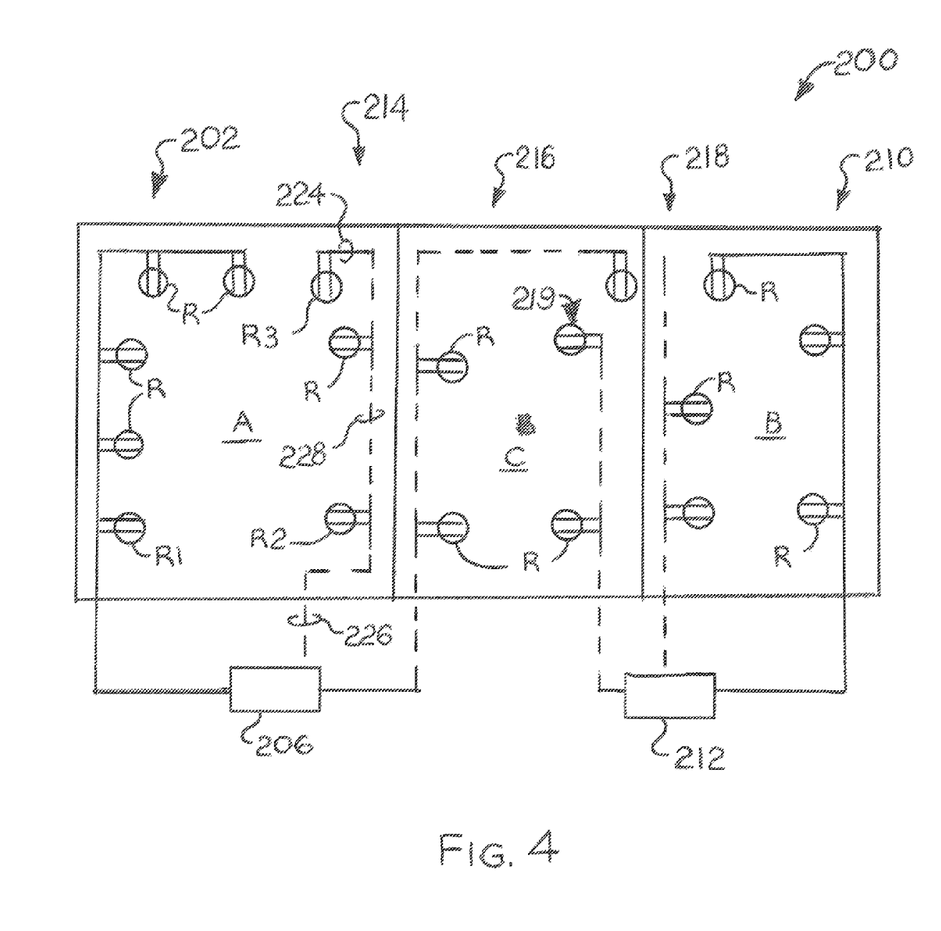
FIG. 4 is a diagrammatic floor plan illustrating the same commercial facility in a subsequent phase of tenant occupancy.

At one point in time, for example, when the tenants A and B first occupy their respective spaces, this allocation of panels to tenants may exist. However, as time passes, tenant usage of leased space may change, as seen in FIG. 4. In the present example, spaces allocated to the tenants A and B have been reduced in area. A new tenant space serving a new tenant C has been introduced. In this example, the tenant C requires power receptacles R. This remodeling change necessitates changes to the various branch circuits 202, 204, 208, 210 which formerly served original tenants A and B.

More specifically, the branch circuits 202 and 210 may remain unchanged. Branch circuits 204, 208 may be modified to become replacement branch circuits 214 and 218, or may be entirely abandoned with or without removal of their physical apparatus, and replaced by entirely new replacement branch circuits 214, 218. This modification to the original electrical layout of FIG. 3 has a consequence which must be accommodated. Namely, the distribution panels 206, 212 each serve more than one tenant, thereby rendering impossible the prior convenient scheme wherein a power meter for each distribution panel 206 or 212 could determine appropriate charges for their respective tenants A and B.

The problem of appropriate billing is solved by utilizing a system which is the functional equivalent of the system 100 of FIG. 2, which incorporates a plurality of circuit breakers of the same type as the circuit breaker 50, a receiver/accumulator 110, a connection 118 which in turn sends the data signals to a computer 120. The computer 120 processes electrical consumption data from radiated consumption data signals indicative of monitored electrical consumption characteristics, and correlates the electrical consumption data with appropriate tenants using radiated address data signals which identify that tenant which is associated with that circuit breaker for which the radiated consumption data signals were generated. Obviously, the number of circuit breakers such as the circuit breakers 50, the actual branch circuits, such as the branch circuits 202, 204, 208, 210, 214, 216, and 218 will change from the example of FIG. 2. However, the operative principle of reporting consumption together with appropriate identity of the branch circuit or tenant remains.

The invention may be viewed as a method of managing a commercial facility such as the facility 200 having plural tenants such as the individual tenants A, B, C, and building space subdivided into tenant spaces occupied by the tenants, for whom power consumption is to be billed to a dedicated billing account for each tenant according to usage of each one of the tenant spaces. The method further bases billing charges only on the radiated consumption data signals and radiated address data signals associated with individual branch circuits, according to the system 100 for example. The method provides continuous and accurate billing charges where remodeling changes to the tenant spaces occur over time, which remodeling changes may comprise at a minumum changes to the point of use portions of branch circuits, construction of new branch circuits, or supply of reused point of use portions of branch circuits.

Point of use portions of branch circuits are explained using the example of the branch circuit 202 seen in FIG. 3. The branch circuit 202 may comprise a proximal or supply portion 220 and a point of use portion 222. The supply portion 220 is that portion of the branch circuit 202 which extends from the distribution panel 206, originating at the terminals of a circuit breaker (not individually shown, but which may be similar to the circuit breaker 50) to the point of use portion 222. The point of use portion 222, which is indicated in FIG. 3 as that portion enclosed within a broken line, starts with the first element which changes or utilizes electrical power. In this example, the receptacle R1 is the first element encountered starting from the distribution panel 206 which changes or utilizes power. Elements provided merely to conduct power, and including conveniences such as junction boxes for splicing and other purposes which facilitate conduction of power, are regarded as part of the supply portion of the branch circuit. Elements which actually or potentially utilize electrical power, such as receptacles, motor connections, which can change power, such as transformers and power correction capacitors, which store power, such as batteries or capacitors, or which enable intentional interruption of power, such as safety disconnect switches, fuses or fuse blocks or both, motor starters, contactors, control switches, and circuit breakers located on the load side of the branch circuit protective device, are examples as elements of the point of use portion of a branch circuit.

The method further incorporates effecting remodeling changes to the tenant spaces occur over time which remodeling changes comprise at least one of the group including changes to the point of use portions of branch circuits, construction of new branch circuits, and reconnection of reused point of use portions of branch circuits to branch circuits not formerly serving the reused point of use portions of branch circuits.

The method comprises a step of providing a commercial facility subdivided at least into a plurality of tenant spaces each having and individual tenant, and a plurality of electrical distribution panels which collectively provide branch circuits to each one of the plural tenant spaces, such as the facility 200, wherein each branch circuit is protected by a circuit breaker located in one of the electrical distribution panels, and each branch circuit comprises a point of use portion and a power transport portion.

The method comprises a second step of providing and operating a remote electrical monitoring and reporting system such as the system 100, which is disposed to monitor electrical consumption characteristics of at least one branch circuit at the circuit breaker serving that one branch circuit, to generate radiated consumption data signals indicative of monitored electrical consumption characteristics, and to generate radiated address data signals which identify that tenant which is associated with that circuit breaker for which the radiated consumption data signals were generated, such that for each individual tenant there is correspondence between total electrical consumption data for all branch circuits serving that individual tenant and the billing account for that individual tenant.

The method comprises a further step of receiving and processing radiated consumption data signals and radiated address data signals for a plurality of the branch circuits of the commercial facility in a manner which determines billing charges for at least two of the tenants and generates billing charges to be applied to each one of the at least two tenants.

The method comprises a further step of effecting at least one tenant usage change wherein remodeling changes comprise at least one of the group including adding load devices to the point of use portions of branch circuits, construction of new branch circuits, and reconnection of reused point of use portions of branch circuits to branch circuits not formerly serving the reused point of use portions of branch circuits. This is further explained with reference to FIG. 4, where new electrical construction work to branch circuits is indicated in broken lines.

An example of adding at least one load device to the point of use portion is seen in the branch circuit 202, which now includes five receptacles R, rather than the three receptacles R seen in FIG. 3. An example of construction of a new branch circuit is seen with the branch circuit 219. An example of reconnection of a reused point of use portion of a branch circuit is seen in the branch circuit 214, where only that portion 224 of the point of use portion of the prior branch circuit 204 remains, and is in FIG. 4 supplied by a new supply portion 226 of the branch circuit 214 and a new point of use portion 228 (that portion shown in broken lines) of the branch circuit 214. To repeat the definition of the supply portion, the supply portion 226 of the branch circuit 214 is that portion extending from the distribution panel 226 to the receptacle R2. The point of use portion 228 extends from the receptacle R2 to the receptacle R3.

The method comprises a step of continuing after effecting at least one tenant usage change to operate the remote electrical monitoring and reporting system such that billing charges for the tenants continue to reflect, for each tenant, only electrical power actually consumed by each one of the tenants after the tenant usage changes, and wherein the billing charges are based only on the radiated consumption data signals and radiated address data signals associated with individual branch circuits. It should be noted that accurate billing ensues despite distribution of branch circuits supplying any one tenant between two or among three or more distribution panels. This realizes the benefit of the invention that real world changes to leased commercial spaces may be accomplished without obliging the owner or operator of the commercial facility or an electrical contractor which has been engaged to perform the actual electrical construction, to make conscious effort to group branch circuits for any one tenant together, or to install new distribution panels. Rather, the electrical construction personnel may utilize the nearest or otherwise most convenient branch circuit breaker, circuit breaker space within a distribution panel, or pre-existing branch circuit which is compatible with the new intended use.

The method may include further aspects. In one example, and as preferred, the method may comprise a further step of causing the radiated consumption data signals and the radiated address data signals associated with each tenant to originate within the circuit breakers serving that tenant. This may best be accomplished by utilizing circuit breakers such as the circuit breaker 50, which may be readily manually installed into a circuit breaker space of any suitable distribution panel, and wired conventionally. A less desirable alternative to this would be to install a conventional circuit breaker, then modify that circuit breaker to provide the first and second radiated signals (i.e., consumption data and address data). A less desirable alternative would be to incorporate the apparatus necessary to function in a corresponding way in other components of a distribution panel, such as supplementary lugs (not shown) for connecting branch circuit wiring, housing exit apparatus such as grommet assemblies (not shown), or still others.

Although only one circuit breaker corresponding to the circuit breaker 50, or a limited few of many more circuit breakers of any one distribution panel may be provided by circuit breakers which correspond to the circuit breaker 50, it is preferred that all circuit breakers serving tenant branch circuits correspond to the circuit breaker 50.

It should be observed that the step of effecting at least one tenant usage change comprises the further step of reallocating at least part of a point of use portion of at least one branch circuit to serve another one of the tenant spaces. This is slightly different from the example of branch circuit 214 in FIG. 4, wherein a reused part 224 of a point of use portion 228 serves the same tenant A both in the original tenant layout of FIG. 3 and after the remodeling illustrated in FIG. 4.

In the novel method, the step of effecting at least one tenant usage change may comprise the further step of continuing to supply each tenant space which has undergone tenant usage changes with branch circuits which originate at a circuit breaker located closest to the point of use portion of the branch circuit for each branch circuit which has been modified to accommodate the tenant usage changes. Again, this reflects a significant advantage of the novel method in that electrical personnel may utilize the most convenient distribution panel for each affected branch circuit. This situation is illustrated in FIG. 4, wherein the latest branch circuits 202, 210, 214, 216, 218 all originate at a circuit breaker closest to the point of use portion of the respective branch circuits.

A distribution panel such as the distribution panel 102 need not have all circuit breakers of the reporting type, such as the type of the circuit breaker 50. Rather, the types of circuit breakers may be mixed to suit.

A novel circuit breaker such as the circuit breaker 50 and the associated reporting system, such as the system 100, may be applied to single phase, multi-phase, and DC systems. Parameters which are monitored to determine billing charges and for other purposes may include those listed in U.S. Patent Application 20060238932, Westbrock, Jr., et al. for example.

The transmission and/or telemetry protocols, modes, formats, etc. used in the embodiments of the present invention may include available protocols, modes, formats, etc. available to those skilled in the art. Similarly, the transmitters 80, receiver/accumulator 110 and computer 120 may comprise transmitters, receivers and computers of currently know types which are commercially available to those skilled in the art. Moreover, the reporting circuit breakers according to the present invention may be located in a plurality of distribution panels and the resulting transmitted signals received by a common receiver, or plural receivers functioning as described above and having signals combined by or before the computer 120. Furthermore, other loads common to the facility or a number of tenants may be managed and accounted as a separate 'tenant'. The present invention may apply to all voltages, phases, and Hertz. Modifications and substitutions made by one skilled in the art are within the scope of the present invention, which is not to be limited except by the claims that follow.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

I claim:

1. A circuit breaker, comprising:
   a plurality of terminals disposed to receive and electrically connect to external power conductors;
   a circuit closure device connected to provide a continuous electrical circuit extending between at least two of said plurality of terminals, and to interrupt said continuous yet interruptible electrical circuit in response to a current flow between said plurality of terminals in excess of a selected threshold value, wherein the circuit closure device comprises separable contacts disposed serially within said continuous electrical circuit, an externally accessible operating handle which is capable of moving between a first position wherein the contacts close to complete an electrical circuit extending between two of the terminals and a second position wherein the contacts are separated to open said electrical circuit extending between two of the terminals;
   a current monitoring device disposed to provide a signal in response to a flow of current in said continuous electrical circuit, which said signal is indicative of magnitude of the flow of current, wherein said current monitoring device comprises a current transformer current measuring device;
   a transmitter disposed to generate a first radiated signal which is indicative of the sensed magnitude of the flow of current, and a second radiated signal which is indicative of identification of the circuit breaker; and a housing disposed to entirely and internally contain said circuit closure device, said current monitoring device, and said transmitter, wherein said housing is dimensioned and externally configured in the manner of a conventional commercially available circuit breaker for use with plug-in distribution panels.

2. The circuit breaker of claim 1, wherein said second radiated signal is a unique identification signal capable of distinguishing the circuit breaker generating the second radiated signal from other structurally similar circuit breakers which generate other radiated signals containing identification data.

3. The circuit breaker of claim 1, wherein the second radiated signal contains identification data correlating the circuit breaker generating the second radiated signal with a predetermined one of plural occupants of a facility containing the circuit breaker which generates the second radiated signal in a manner which distinguishes the predetermined one of the plural occupants from radiated signals of circuit breakers associated with other ones of the plural occupants.

4. The circuit breaker of claim 1, wherein the transmitter is wireless.

5. The circuit breaker of claim 4, wherein the transmitter is a radio frequency transmitter.

6. The circuit breaker of claim 1, further comprising an illuminable indicator disposed on the externally accessible operating handle of the circuit closure device, and circuitry disposed to illuminate the illuminable indicator so as to annunciate an operating condition of the circuit breaker.

7. The circuit breaker of claim 6, wherein the illuminable indicator comprises a light emitting diode.

8. The circuit breaker of claim 6, wherein the circuitry is disposed sense current flowing through the terminals of the circuit breaker and to illuminate the illuminable indicator responsive to sensing of current flowing through the terminals of the circuit breaker.

9. The circuit breaker of claim 8, wherein the illuminable indicator is green.

10. The circuit breaker of claim 6, wherein the circuitry is disposed sense tripping of the circuit breaker and to illuminate the illuminable indicator responsive to sensing tripping of the circuit breaker.

11. The circuit breaker of claim 10, wherein the illuminable indicator is red.

* * * * *